J. J. P. SMITH.
LUBRICATING DEVICE FOR ENGINES.
APPLICATION FILED AUG. 29, 1913.

1,144,257.

Patented June 22, 1915.

Witnesses
Fenton S. Belt
L. E. Witham.

Inventor
John J. Pringle Smith
By Sowell & Sowell
Attorneys

UNITED STATES PATENT OFFICE.

JOHN J. PRINGLE SMITH, OF CHARLESTON, SOUTH CAROLINA.

LUBRICATING DEVICE FOR ENGINES.

1,144,257.  Specification of Letters Patent.  Patented June 22, 1915.

Application filed August 29, 1913. Serial No. 787,309.

*To all whom it may concern:*

Be it known that I, JOHN J. PRINGLE SMITH, a citizen of the United States, residing at Charleston, in the county of Charleston and State of South Carolina, have invented certain new and useful Improvements in Lubricating Devices for Engines; and I hereby declare that the following is a full, clear, and exact description thereof, reference being had to the accompanying drawings, which form part of this specification.

This invention is a novel means for supplying oil to the piston, or other parts of an engine or machine having a crank shaft.

The invention is particularly designed for use in connection with explosive engines, and its object is to supply a small quantity of oil to the piston, or other desired part, at each rotation of the crank, or reciprocation of the connecting rod.

In order to impart a clear and full understanding of the invention I will explain the same in detail as embodied in one practical form of apparatus illustrated in the accompanying drawings, and will summarize in the claims the essential features and combinations of parts of the invention for which protection is desired.

Figure 1:
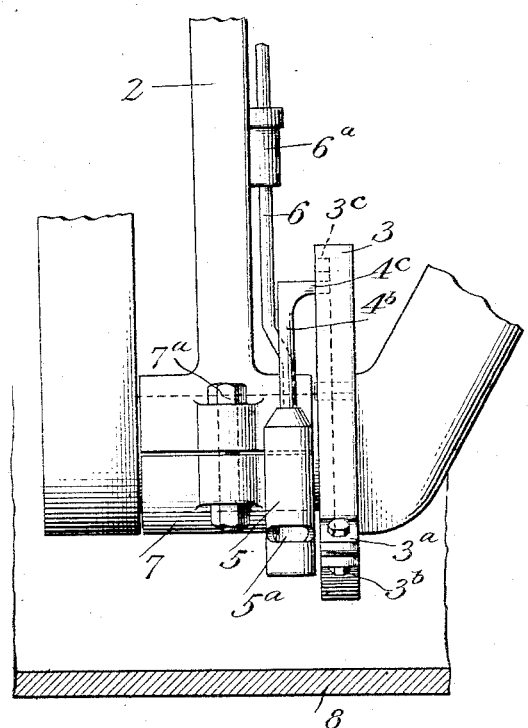
Figure 2:
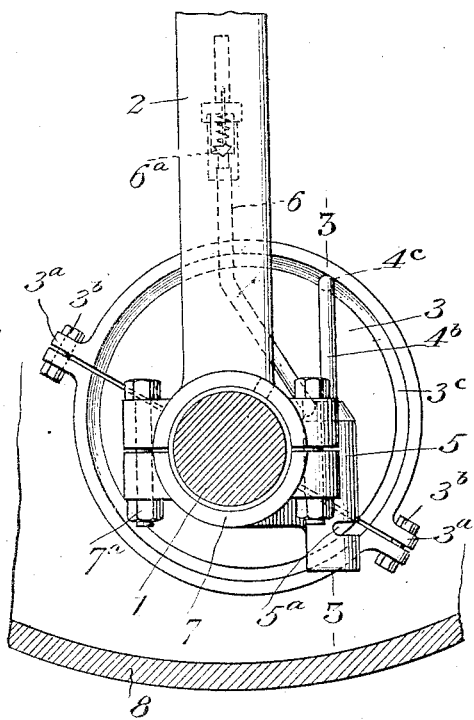
Figure 3:
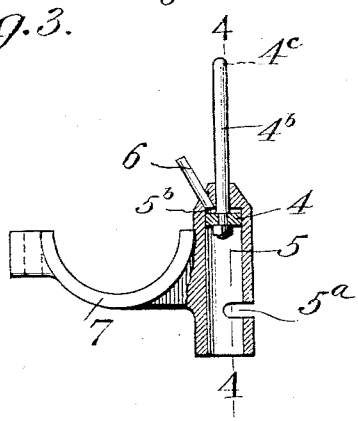
Figure 4:
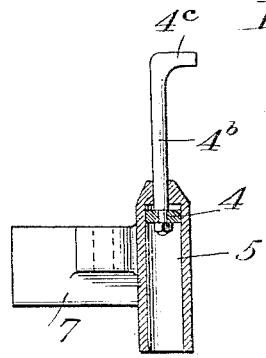

In said drawings Figure 1 is a side elevation of a part of a crank shaft and pitman rod connected therewith, with my novel oil pumping devices mounted thereon. Fig. 2 is a side view of Fig. 1 with the outer portion of the crank removed. Fig. 3 is a detail section through the oil pump on line 3—3, Fig. 2. Fig. 4 is another section therethrough on line 4—4, Fig. 3.

1 designates a crank shaft of any suitable construction, which may be the shaft of an ordinary explosive engine; and 2 is a pitman rod connected to the crank of shaft 1 in the usual manner. On this crank adjacent the rod 2 is eccentrically mounted a cam or eccentric member 3 which may be made in two parts, divided in the axial line of the crank, and provided with ears 3ª on the outer ends of their meeting edges by which they are securely fastened together and clamped upon the crank by means of bolts 3ᵇ. This construction of the cam member enables it to be readily attached to any engine crank, and also enables it to be easily adjusted to any desired position rotatively on the crank.

In the face of member 3 I provide a race cam groove 3ᶜ which is engaged by a stud or pin 4ᶜ on the outer end of a piston rod 4ᵇ, which extends into a small pump cylinder 5, attached to the head of the pitman adjacent the member 3. Rod 4ᵇ is connected to the piston 4 in the cylinder 5. As shown, cylinder 5 is provided with an oil-inlet, indicated at 5ª near its lower end, and its upper end is closed but is provided with an outlet port 5ᵇ which may be connected to any suitable duct which leads to any desired point of discharge of the oil. As shown the port connects with a pipe 6 which is fast to the pitman rod in any suitable manner, and a check valve 6ª may be interposed in such oil-duct or pipe at any suitable point, to prevent the return of oil to the pump cylinder 5.

The pump cylinder 5 may be secured to the pitman in any suitable way; but as shown it is formed integral with the lower half 7 of the journal-box or head connecting the piston to the crank, said part 7 being secured to the other portion of this bearing, formed integral with the pitman, by means of bolts 7ª. It should be understood however that while the described connection of the oil pump cylinder 5 to the pitman is a novel feature, the present invention is not limited to such construction. Neither is the invention limited to the particular construction of the eccentrically located cam member on the crank. The drawings however show a novel, useful and practical form of the invention. The essentially novel features of the construction shown are a cam member on the crank shaft and rotating therewith; a pump cylinder rigidly connected with the pitman and moving therewith and connections between the pump piston rod and the cam member, whereby for each rotation of the crank shaft the pump piston is reciprocated and a supply of oil is forwarded through the pipe or duct 6 to the point of utilization. Of course if it is desired to forward oil to the crank shaft bearings or along the crank shaft, the positions of the pump and cam member could be reversed.

In practice the crank is inclosed in a casing conventionally indicated at 8, which casing is partially or wholly filled with oil so that the crank and pitman are lubricated and at each time the crank rotates the pump 5 will be submerged in the oil and as the pump piston is reciprocated oil will be pumped to the duct 6 as above explained.

While I have referred to and shown an eccentric member I do not wish to be limited to the use of such an eccentrically located member to operate the pump piston, the essential thing being that for each rotation of the crank the pump rod should be reciprocated once by reason of the relative orbital motion of the pump and cam or eccentric; and any mechanically equivalent device that could be substituted for the particular cam member and connections shown in the drawings, I consider within the scope of the broader claims.

The simplicity and efficiency of the apparatus disclosed in the drawings will be readily appreciated by those familiar with the art, and the operation thereof is clearly explained above.

What I claim is:

1. In an oil pumping device, the combination of a crank, a pitman connected therewith, an eccentric grooved cam on the crank, a pump on the pitman, and a pump piston rod operatively engaged with the groove in said cam.

2. In combination with a crank and a pitman connected therewith; of an eccentrically grooved member on the crank, a pump fixed to the pitman, a piston in said pump, and a pump-piston rod operatively engaged with the groove in said member.

3. In an oil pumping device, the combination of a crank, a pitman connected therewith, an eccentrically grooved member on the crank, a pump fixed to the pitman head, a piston in said pump, a piston rod connected therewith and operatively engaged with the groove in said member, and means for conducting oil away from said pump, substantially as described.

4. In combination with a crank shaft and pitman; a cam member on the crank shaft, a pump cylinder on the pitman, a piston, a piston rod, and means positively connecting said rod to said member for positively reciprocating the pump piston during the rotation of the shaft.

5. In an oil supplying apparatus, the combination of a crank, and a pitman; with a cam member and an oil pump cylinder respectively mounted on and moving with the pitman and the crank, a piston in the pump, a piston rod, and means positively connecting said rod to said cam member whereby said piston is positively reciprocated by said cam member during each rotation of the crank.

6. In combination with a crank shaft and pitman; of an eccentric cam member attached to the crank shaft, a pump cylinder on the pitman, a pump-piston rod, and means positively connecting said rod to the eccentric cam member whereby the pump-piston is positively reciprocated by said cam member during each rotation of the crank.

7. In an oil pumping device, the combination of a crank, a pitman connected therewith; an eccentric cam on the crank, a pump cylinder on the pitman, a piston in said pump, and a rod connected therewith and positively engaged with the said cam so as to be positively reciprocated thereby during each rotation of the crank.

In testimony that I claim the foregoing as my own, I affix my signature in presence of two witnesses.

JOHN J. PRINGLE SMITH.

Witnesses:
  CHAS. E. RIORDON,
  BERNADINE M. FERRITER.